Patented Jan. 5, 1932

1,839,526

UNITED STATES PATENT OFFICE

SHAILER L. BASS AND HOWARD N. FENN, OF MIDLAND, MICHIGAN, ASSIGNORS TO THE DOW CHEMICAL COMPANY, OF MIDLAND, MICHIGAN, A CORPORATION OF MICHIGAN

PHENYLSALICYLIC ACID AND METHOD OF MAKING SAME

No Drawing.   Application filed May 12, 1930.   Serial No. 451,858.

The present invention relates to phenylsalicylic acid, particularly to a method for the preparation thereof, which involves reacting para-phenylphenol with chloroform to form an intermediate aldehyde salt and then converting the latter into 5-phenylsalicylic acid.

We have found that 5-phenylsalicylic acid may be prepared in good yield from para-phenylphenol by reacting the latter with chloroform in the presence of a suitable alkali, such as sodium or potassium hydroxide, then reacting the thereby formed intermediate alkali metal salt of 5-phenylsalicyl aldehyde, with a caustic alkali to form the corresponding acid salt, which latter may then be converted into the free acid, or recovered as such.

Our invention, then, consists of the new compound and procedure hereinafter fully described and particularly pointed out in the claims, the following description setting forth but several of the various ways in which the principle of our invention may be used.

Para-phenylphenol may be converted into 5-phenylsalicylaldehyde in any desired way, for instance by reacting the former with chloroform and aqueous sodium hydroxide solution under either atmospheric or increased pressure, as preferred, such as the pressure of the reaction mixture at the temperature used. The reaction may be conducted at a temperature between about 60° and 150° C., with agitation of the components. The salt of the aldehyde, being relatively insoluble, in the hot liquors, may substantially be separated from the reaction mixture by filtration of the latter while still hot.

The so obtained intermediate compound, sodium para-phenylsalicylaldehyde, may then be converted into the corresponding acid in any suitable way. For instance, the intermediate aldehyde salt may be oxidized by heating, e. g. fusion thereof, with an excess of caustic alkali, whereby hydrogen is evolved and the salt of the acid is formed, the latter yielding the free acid by acidification thereof. We prefer to react the alkali-metal salt of the aldehyde with about twice its weight of substantially anhydrous potassium hydroxide at a temperature of between approximately 150° and 225° C. A lesser amount of the alkali reduces the yield of product, because of the formation of undesirable by-products. A greater amount of the alkali is unnecessary. Potassium hydroxide may be replaced in whole or in part by sodium hydroxide although such replacement necessitates the use of a higher temperature, up to about 275° C. Moreover, the alkali-metal hydroxide may contain water, i. e. less than about 10 per cent. of the latter. However, higher temperatures and/or the presence of an appreciable amount of water cause a certain amount of destructive oxidation.

The following example illustrates a preferred way of utilizing our invention.

*Example*

A mixture containing 2 moles para-phenylphenol, 13 moles sodium hydroxide, 300 cc. water, and 3.8 moles chloroform was reacted at a temperature of 95° to 100° C. under the pressure of the components thereof, i. e. about 60 pounds, for approximately 1 hour, employing mechanical stirring. The insoluble substance thereby formed was filtered from the reaction mixture while still at a temperature above about 60° C., digested with boiling sodium hydroxide solution of about 1 per cent. concentration and containing a small amount of decolorizing charcoal, and filtered while hot. The yellow sodium salt of 5-phenylsalicylaldehyde crystallized from the filtrate on cooling the latter, being obtained thereby in an approximately 80 per cent. yield, based on the para-phenylphenol reacted.

The sodium salt of 5-phenylsalicylaldehyde was intimately mixed and warmed with twice its weight of substantially anhydrous potassium hydroxide, until the vigorous evolution of hydrogen had substantially ceased. The pasty mass then was melted and kept in said state for about 5 minutes, then cooled, dissolved in water, and the so obtained solution filtered and acidified with hydrochloric acid, thereby forming a creamy white precipitate of 5-phenylsalicylic acid in substantially quantitative yield. The latter, when recrystallized from 25 per cent. ethyl alcohol, was obtained in silky white needles melting at 217° to 218° C. (uncorrected).

Various esters of 5-phenylsalicyclic acid were prepared by reacting said acid with the appropriate alcohol in the presence of a condensing agent such as sulphuric or hydrochloric acid. For example:—

Methyl ester—melting point—95° C.
Ethyl ester—melting point—49° C.

The esters, which may be recrystallized from suitable organic solvents such as alcohol, benzene, carbon tetrachloride, and the like, give an intense violet coloration in dilute alcoholic solution with ferric chloride.

In brief, our invention concerns the preparation of 5-phenylsalicylic acid from para-phenylphenol by converting the latter into 5-phenylsalicylaldehyde, and then oxidizing the latter to the corresponding acid, for instance by heating the aldehyde with an alkali-metal hydroxide, whereby the aldehyde group is oxidized to an acid group, and hydrogen is evolved.

Other modes of applying the principle of our invention may be employed instead of the one explained, change being made as regards the steps or materials employed, provided the details stated by any of the following claims or the equivalent of such be employed.

We therefore particularly point out and distinctly claim as our invention:—

1. The method of making 5-phenylsalicylic acid which comprises oxidizing 5-phenylsalicylaldehyde with caustic alkali to the corresponding acid.

2. The method of making 5-phenylsalicylic acid which comprises heating 5-phenylsalicylaldehyde with a caustic alkali to a temperature between 150° and 275° C., whereby the aldehyde group is oxidized to an acid group, and hydrogen is evolved.

3. The method of making 5-phenylsalicylic acid which comprises heating 5-phenylsalicylaldehyde with potassium hydroxide to a temperature between 150° and 275° C., whereby the aldehyde group is oxidized to an acid group, and hydrogen is evolved.

4. As a new compound, a 5-phenylsalicylic compound having the general formula,

wherein X represents hydrogen or a metal radical.

5. As a new compound, 5-phenylsalicylic acid having the formula,

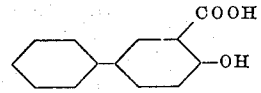

and melting at 217° to 218° C., uncorrected.

Signed by us this 7 day of May, 1930.
SHALER L. BASS.
HOWARD N. FENN.